Oct. 4, 1927.  
C. L. BARDIN  
1,644,224  
SPRING SUSPENSION FOR VEHICLES  
Filed May 12, 1924   2 Sheets-Sheet 1
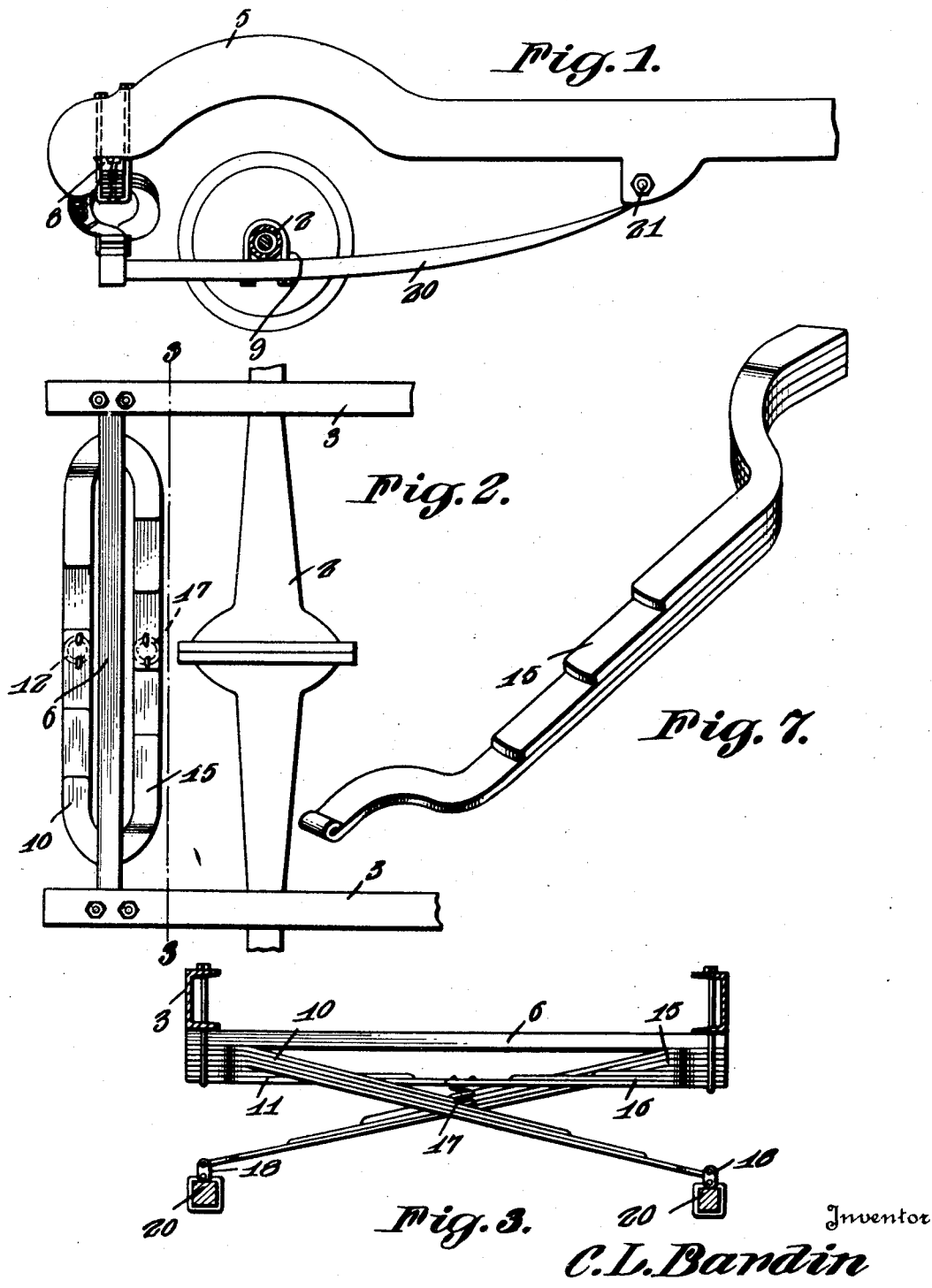

Oct. 4, 1927.
C. L. BARDIN
1,644,224
SPRING SUSPENSION FOR VEHICLES
Filed May 12, 1924
2 Sheets-Sheet 2
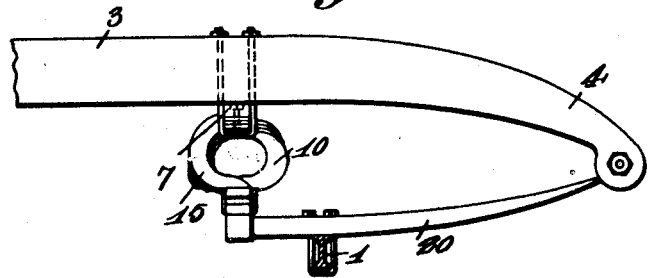
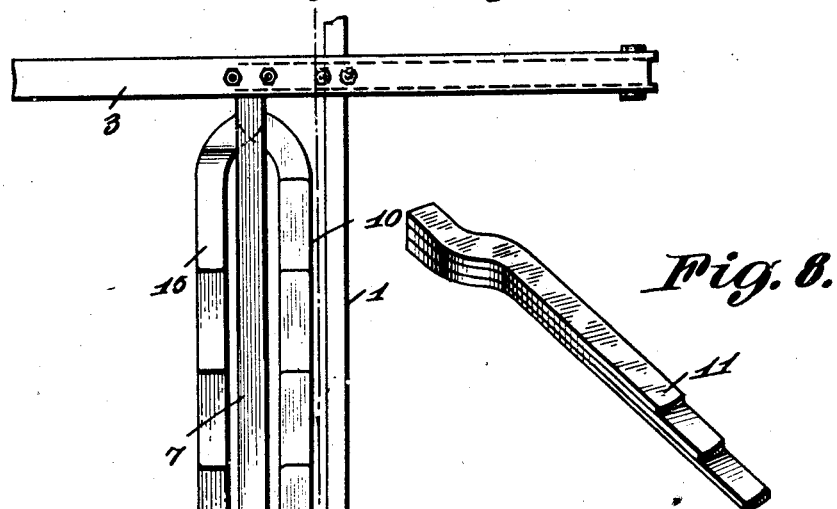
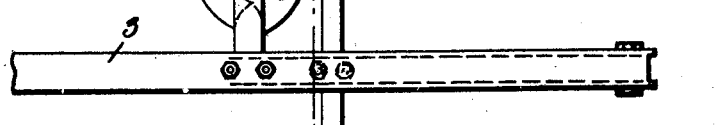
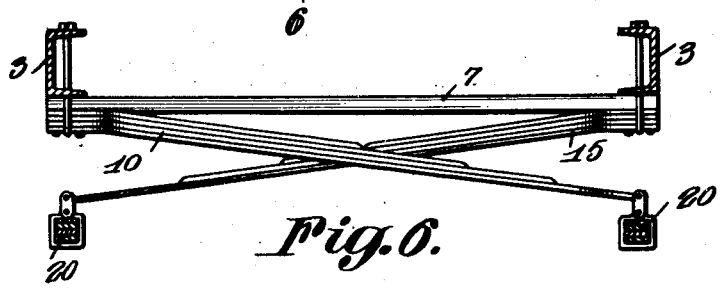
C. L. Bardin, Inventor Patented Oct. 4, 1927.

1,644,224

UNITED STATES PATENT OFFICE.

CLARENCE LETCHER BARDIN, OF LIMESTONE, FLORIDA.

SPRING SUSPENSION FOR VEHICLES.

Application filed May 12, 1924. Serial No. 712,669.

This invention relates to an improved spring suspension for vehicles and more particularly to a spring suspension where the end portions of the vehicle frame are adapted to extend beyond the front and rear axles of the vehicle whereby the vehicle frame is supported in such a manner as to provide increased resiliency and flexibility.

One object of the invention is to provide an improved spring device of this character in which the front and rear axles are positively fixed in their transverse relation to the frame in a manner to allow them free vertical vibration without altering their respective positions in relation to the steering gear or driving rod mechanism.

Another object is to provide such a construction in which the springs at their two points of suspension are vertical exactly equalizing the suspension of weight.

Another object of the invention is to provide suspension means of this character whereby riding comfort is promoted, the life of the vehicle increased and the upkeep cost decreased safety in driving is also promoted by reducing the tendency to skid owing to the fact that the tendency of the suspension is to throw the balance of weight to the opposite side from the strain.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation of the rear end of a vehicle chassis showing this improved suspension applied;

Fig. 2 is a plan view thereof;

Fig. 3 is a transverse section taken on the line 3—3 of Fig. 2;

Fig. 4 is a side elevation of the front portion of the vehicle chassis equipped with this invention showing a slightly different form of the invention.

Fig. 5 is a plan view thereof;

Fig. 6 is a transverse section taken on the line 6—6 of Fig. 5.

Fig. 7 is a detail perspective of one of the spring members; and

Fig. 8 is a similar view of another member.

In the embodiment illustrated 1 designates the front axle and 2 the rear axle of an automobile of the usual construction, said axles being supported by the usual wheels not shown.

The vehicle frame comprises a pair of longitudinally extending side bars 3 the front ends of which project beyond the axle 1 and are curved downwardly as shown at 4 while the rear ends thereof have upwardly bowed portions 5 arranged over the rear axle the terminals thereof extending downwardly and connected by a cross bar 6. A similar bar 7 connects the front ends of the side bars as is shown clearly in Fig. 5.

The suspension springs used at the rear end of the vehicle comprise springs 10 and 15 of the cantilever type, the body portions of which are offset in opposite directions as shown in Fig. 2, one end of each of these springs is attached to the cross bar 6 and also to the frame members 3 by suitable clamps here shown in the form of U bolts 8. These springs 10 and 15 may be composed of any number of leaves according to the weight to be suspended and are connected at the ends opposite those which are connected with the cross bar to the rear ends of torque or line bars 20 which are pivotally connected at their front ends to the lower faces of the side bars 3 as shown at 21. The torque bars 20 are secured to the axle 2 by means of U bolts 9 as shown clearly in Fig. 1. The springs 10 and 15 cross each other midway their length and form cantilever types of suspension.

Short springs 11 and 16 which constitute an equalizing or balancing attachment are secured at their outer ends to the ends of springs 10 and 15 and to the cross bar 6. The free ends of these springs 11 and 16 overlie the springs 10 and 15 respectively and are connected therewith by coiled springs 12 and 17. These partial length springs 11 and 16 are formed of one or more leaves and being connected with the main springs 10 and 15 by the coiled springs 12 and 17 operate as an equalizer of tension and as a shock absorber. The lower ends of the springs 10 and 15 are connected by a flexible joint 18 with the rear ends of the bars 20.

The construction shown at the front end of the vehicle in Figs. 4, 5, and 6 is similar to that shown in the other figures except that the springs 11 and 16 are omitted and this construction may be used either at the front or rear of the vehicle or both or the form above described which provides a complete unit may be used.

From the above description it will be obvious that the connection between the frame and the axles is simple and substantial fixing positively and firmly the axles in their transverse relation to the frame.

The spring unit shown in Figs. 1 to 3 is bolted to the frame with U bolts in suitable positions either in front or rear or directly over the axles thus permitting a free perpendicular vibration of the axles without altering their respective positions in relation to the steering gear or driving rod mechanism. The springs 10 and 15 at their two points of suspension being perpendicular will exactly equalize a suspension of weight which is an important feature in spring suspension.

In ordinary parallel suspension mechanism when the right wheel strikes an obstruction or hole, a right lateral lurch is imparted to the vehicle at one corner thereof while with the suspension herein shown and described when the right wheel strikes a depression owing to the equalizing springs 12 and 17 the tendency will be for the drop into the depression to be transmitted to both corners of the vehicle thus producing less than half the ordinary jar.

I claim:—

A vehicle spring embodying a pair of spring members, each of said spring members having one of its respective ends secured to the chassis of a vehicle at the side edges thereof and disposed transversely of the chassis, the opposite end of each spring extending downwardly and terminating at a point adjacent to the opposite side of the chassis, bars having their forward ends pivotally connected to the side rails of the chassis and disposed in parallel relation with the side rails of the chassis for pivotally connecting the bars to the spring members, and means on the bars for securing an axle to the bars intermediate the ends of the bars.

In testimony that I claim the foregoing as my own, I have hereto affixed my signature.

CLARENCE LETCHER BARDIN.